(12) United States Patent
Wu et al.

(10) Patent No.: US 11,221,549 B2
(45) Date of Patent: Jan. 11, 2022

(54) PROJECTOR CAPABLE OF ADJUSTING A PROJECTED IMAGE ACCORDING TO A CURRENT TEMPERATURE

(71) Applicant: QISDA CORPORATION, Taoyuan (TW)

(72) Inventors: Jou-Hsuan Wu, Taoyuan (TW); Chih-Wei Cho, New Taipei (TW)

(73) Assignee: Qisda Corporation., Taoyuan (TW)

( * ) Notice: Subject to any disclaimer, the term of this patent is extended or adjusted under 35 U.S.C. 154(b) by 0 days.

(21) Appl. No.: 16/920,743

(22) Filed: Jul. 5, 2020

(65) Prior Publication Data

US 2021/0286240 A1 Sep. 16, 2021

(30) Foreign Application Priority Data

Mar. 11, 2020 (CN) .......................... 202010167508.6

(51) Int. Cl.

| G03B 21/14 | (2006.01) |
|---|---|
| G03B 21/16 | (2006.01) |
| G01K 7/16 | (2006.01) |
| H04N 9/31 | (2006.01) |

(52) U.S. Cl.
CPC .............. G03B 21/145 (2013.01); G01K 7/16 (2013.01); G03B 21/16 (2013.01); H04N 9/31 (2013.01)

(58) Field of Classification Search
CPC ........ G03B 21/16; G03B 21/18; G03B 21/28; G03B 21/142; G03B 21/145; G03B 21/147; G03B 21/208; G03B 21/2013; G03B 21/2033; G03B 21/2053; H04N 9/31; H04N 9/045; H04N 9/04517; H04N 9/365; H04N 9/23254; H04N 9/646; G01K 7/00; G01K 7/01; G01K 7/16
See application file for complete search history.

(56) References Cited

U.S. PATENT DOCUMENTS

| 2011/0019109 | A1* | 1/2011 | Maeda | H04N 9/317 348/745 |
|---|---|---|---|---|
| 2015/0070564 | A1* | 3/2015 | Okawa | H04N 5/23212 348/345 |
| 2015/0179147 | A1* | 6/2015 | Rezaiifar | G06F 3/011 345/625 |
| 2018/0146179 | A1* | 5/2018 | Ohno | G03B 21/145 |
| 2018/0262728 | A1* | 9/2018 | Kobayashi | G03B 21/142 |
| 2019/0313066 | A1* | 10/2019 | Kobayashi | H04N 9/317 |
| 2020/0103649 | A1* | 4/2020 | Higashiyama | G02B 27/0101 |

* cited by examiner

*Primary Examiner* — Sultan Chowdhury

(57) ABSTRACT

A projector includes a lens, a displacement adjusting unit, an imaging unit, a temperature sensing unit, a storage unit and a processing unit. The displacement adjusting unit is connected to the lens. The temperature sensing unit senses a current temperature. The storage unit stores a plurality of temperature ranges and a plurality of displacement variations corresponding to the temperature ranges. The processing unit receives a current image. The processing unit compares the current temperature with the temperature ranges to determine a current displacement variation corresponding to the current temperature from the displacement variations. The processing unit performs at least one of following steps according to the current displacement variation: controlling the displacement adjusting unit to adjust a displacement of the lens; adjusting a displacement of the current image on the imaging unit; and performing an image adjusting process for the current image.

20 Claims, 14 Drawing Sheets

Thermal drift

PROJECTOR CAPABLE OF ADJUSTING A PROJECTED IMAGE ACCORDING TO A CURRENT TEMPERATURE

BACKGROUND OF THE INVENTION

1. Field of the Invention

The invention relates to a projector and, more particularly, to a projector capable of adjusting a projected image according to a current temperature.

2. Description of the Prior Art

Recently, projectors are getting more and more popular. With the capacity of video playing, projectors are applied not only for common office meetings, but also for various seminars or academic courses. In general, the projector comprises some optical components including a lens, alight source, an optical engine and so on, wherein the light source is configured to emit light and the light is processed by the optical engine and then projected to form an image through the lens. The optical engine generates a large amount of heat during operation, such that thermal expansion and contraction may occur on the optical components. Consequently, a position and a focus of a projected image may be affected by thermal drift.

SUMMARY OF THE INVENTION

An objective of the invention is to provide a projector capable of adjusting a projected image according to a current temperature, so as to solve the aforesaid problems.

According to an embodiment of the invention, a projector comprises a lens, a displacement adjusting unit, an imaging unit, a temperature sensing unit, a storage unit and a processing unit. The displacement adjusting unit is connected to the lens. The imaging unit is disposed with respect to the lens. The temperature sensing unit senses a current temperature. The storage unit stores a plurality of temperature ranges and a plurality of displacement variations corresponding to the temperature ranges. The processing unit is electrically connected to the displacement adjusting unit, the imaging unit, the temperature sensing unit and the storage unit. The processing unit receives a current image. The processing unit compares the current temperature with the temperature ranges to determine a current displacement variation corresponding to the current temperature from the displacement variations. The processing unit performs at least one of following steps according to the current displacement variation: controlling the displacement adjusting unit to adjust a displacement of the lens; adjusting a displacement of the current image on the imaging unit; and performing an image adjusting process for the current image.

According to another embodiment of the invention, a projector comprises a lens, an imaging unit, a temperature sensing unit, a storage unit and a processing unit. The imaging unit is disposed with respect to the lens. The temperature sensing unit senses a current temperature. The storage unit stores a plurality of temperature ranges and a plurality of displacement variations corresponding to the temperature ranges. The processing unit is electrically connected to the imaging unit, the temperature sensing unit and the storage unit. The processing unit receives a current image. The processing unit compares the current temperature with the temperature ranges to determine a current displacement variation corresponding to the current temperature from the displacement variations. The processing unit performs at least one of following steps according to the current displacement variation: adjusting a displacement of the current image on the imaging unit; and performing an image adjusting process for the current image.

According to another embodiment of the invention, a projector comprises a lens, a focus adjusting unit, a temperature sensing unit, a storage unit and a processing unit. The focus adjusting unit is connected to the lens. The temperature sensing unit senses a current temperature. The storage unit stores a plurality of temperature ranges and a plurality of focus variations corresponding to the temperature ranges. The processing unit is electrically connected to the focus adjusting unit, the temperature sensing unit and the storage unit. The processing unit receives a current image. The processing unit compares the current temperature with the temperature ranges to determine a current focus variation corresponding to the current temperature from the focus variations. The processing unit performs at least one of following steps according to the current focus variation: controlling the focus adjusting unit to adjust a focus of the lens; and performing a sharpening process for the current image.

According to another embodiment of the invention, a projector comprises a temperature sensing unit, a storage unit and a processing unit. The temperature sensing unit senses a current temperature. The storage unit stores a plurality of temperature ranges and a plurality of focus variations corresponding to the temperature ranges. The processing unit is electrically connected to the temperature sensing unit and the storage unit. The processing unit receives a current image. The processing unit compares the current temperature with the temperature ranges to determine a current focus variation corresponding to the current temperature from the focus variations. The processing unit performs a sharpening process for the current image according to the current focus variation.

As mentioned in the above, the invention may selectively control the displacement adjusting unit (if any) to adjust the displacement of the lens, adjust the displacement of the current image on the imaging unit and/or perform the image adjusting process for the current image according to the current temperature, so as to prevent the projected image from shifting with respect to the projection plane due to thermal drift. Furthermore, the invention may selectively control the focus adjusting unit (if any) to adjust the focus of the lens and/or perform the sharpening process for the current image according to the current temperature, so as to prevent the projected image from blurring (i.e. out of focus) due to thermal drift.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
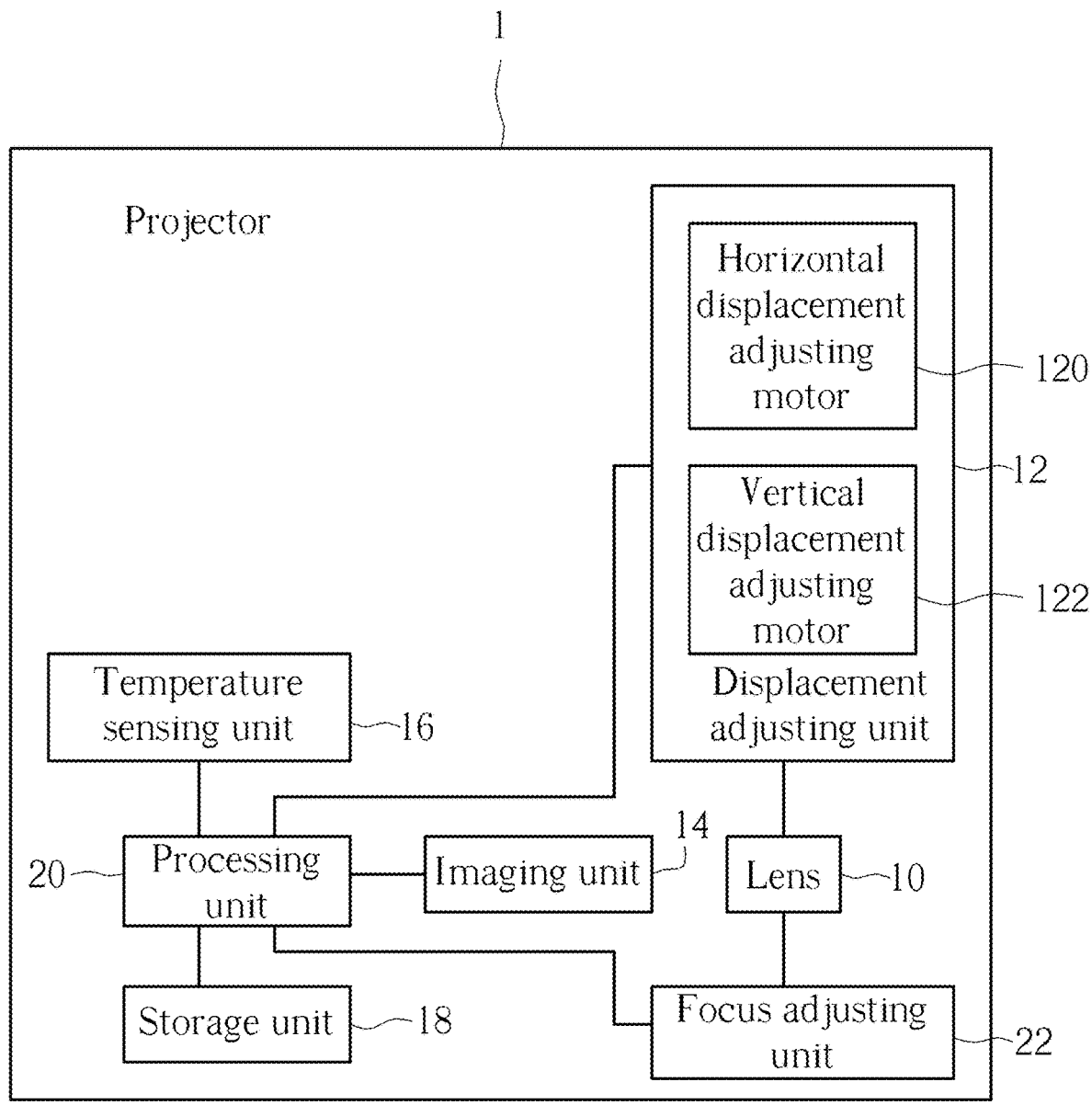
FIG. 1 is a functional block diagram illustrating a projector 1 according to an embodiment of the invention.

Referring to FIG. 1, FIG. 1 is a functional block diagram illustrating a projector 1 according to an embodiment of the invention. As shown in FIG. 1, the projector 1 comprises a lens 10, a displacement adjusting unit 12, an imaging unit 14, a temperature sensing unit 16, a storage unit 18, a processing unit 20 and a focus adjusting unit 22. In general, the projector 1 may be further equipped with some necessary hardware or software components for specific purposes, such as input/output port, applications, circuit board, power supply, communication module, etc., and it depends on practical applications. Furthermore, the projector may further comprise an illumination module configured to provide light and the light is reflected by the imaging unit 14 and then projected to form an image through the lens 10. It should be noted that the imaging principle of the projector 1 is well known by one skilled in the art, so the detailed explanation will not be depicted herein.

The displacement adjusting unit 12 and the focus adjusting unit 22 are connected to the lens 10. In this embodiment, the displacement adjusting unit 12 may comprise a horizontal displacement adjusting motor 120 and a vertical displacement adjusting motor 122, wherein the horizontal displacement adjusting motor 120 is configured to adjust a horizontal displacement of the lens 10 and the vertical displacement adjusting motor 122 is configured to adjust a vertical displacement of the lens 10. In another embodiment, the displacement adjusting unit 12 may only comprise one of the horizontal displacement adjusting motor 120 and the vertical displacement adjusting motor 122 according to practical applications. In this embodiment, the focus adjusting unit 22 may be a focus adjusting motor configured to adjust a focus of the lens 10.

The imaging unit 14 is disposed with respect to the lens 10. In this embodiment, the imaging unit 14 may be a digital micromirror device (DMD). In practical applications, the projector 1 may be equipped with one or more imaging units 14. The processing unit 20 is electrically connected to the displacement adjusting unit 12, the imaging unit 14, the temperature sensing unit 16, the storage unit 18 and the focus adjusting unit 22. In this embodiment, the processor 20 may be a processor or a controller with signal processing function, the temperature sensing unit 16 may be a temperature sensor, and the storage unit 18 may be a memory, a hard disc or other data storage devices.

Figure 2:
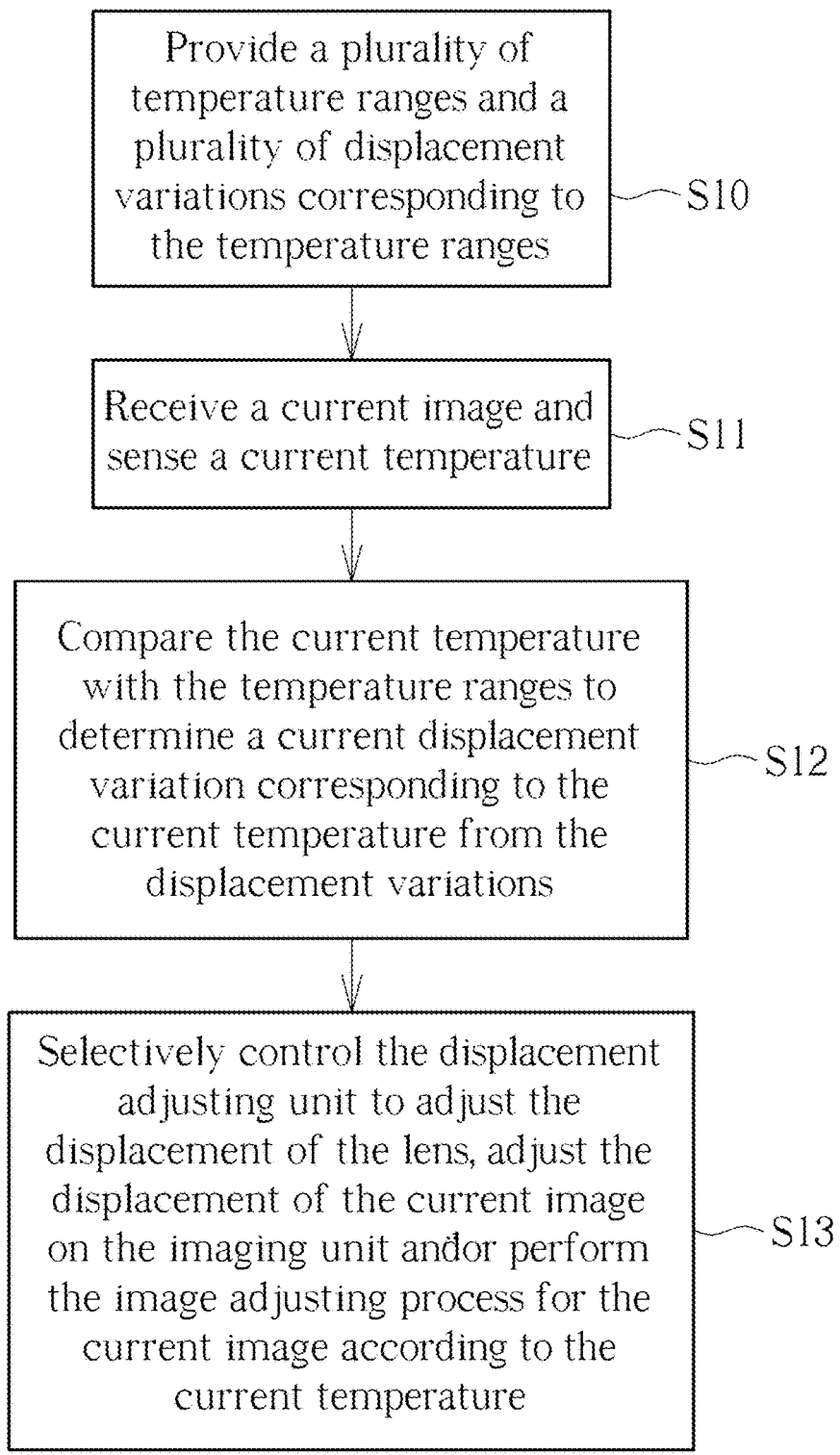
FIG. 2 is a flowchart illustrating a projection method according to an embodiment of the invention.
Figure 3:
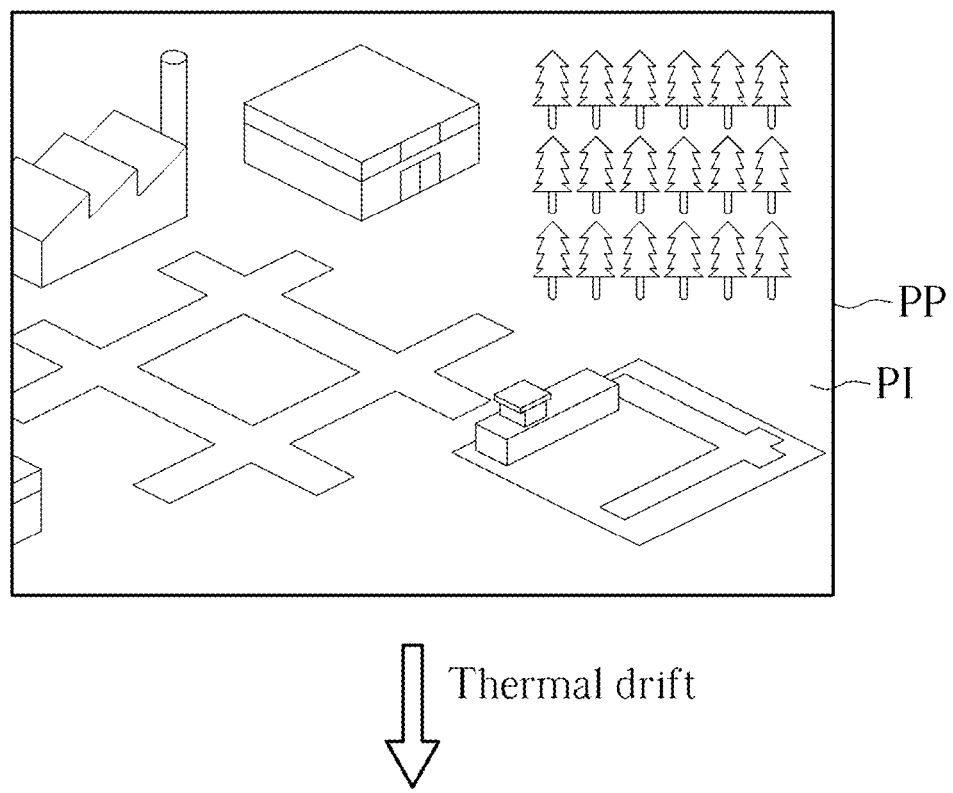
FIG. 3 is a schematic diagram illustrating that a projected image shifts with respect to a projection plane due to thermal drift.
Figure 3:
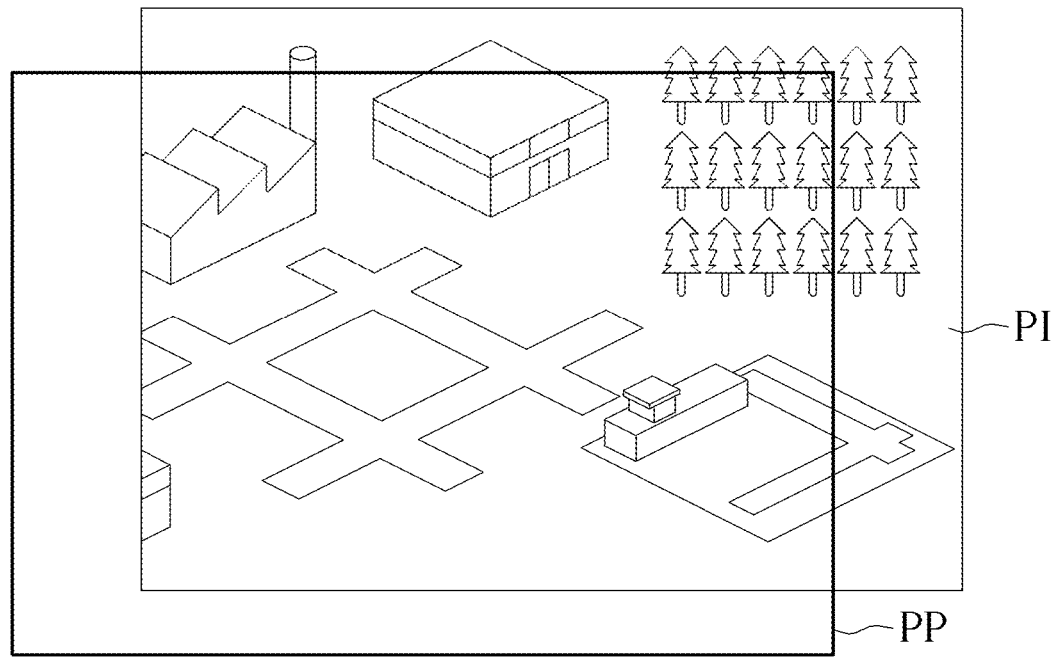

Referring to FIGS. 2 and 3, FIG. 2 is a flowchart illustrating a projection method according to an embodiment of the invention and FIG. 3 is a schematic diagram illustrating that a projected image PI shifts with respect to a projection plane PP due to thermal drift. The projection method shown in FIG. 2 is adapted to the aforesaid projector 1. When the projected image PI of the projector 1 shifts with respect to the projection plane PP due to thermal drift (as shown in FIG. 3), the projection method shown in FIG. 2 may be used to adjust the projected image PI. First, the invention may provide a plurality of temperature ranges and a plurality of displacement variations corresponding to the temperature ranges for the projector 1 (step S10), as shown in table 1 below. The storage unit 18 is configured to store the temperature ranges and the displacement variations corresponding to the temperature ranges shown in table 1. In this embodiment, the displacement variation may comprise a horizontal displacement variation and a vertical displacement variation. The invention may measure the displacement variations of the projected image PI of the projector 1 on horizontal direction and vertical direction under different temperature ranges, so as to obtain the look-up table shown in table 1. Then, the invention stores the look-up table in the storage unit 18. It should be noted that the values shown in table 1 are only used for illustration purpose and the invention is not so limited.

TABLE 1

| | Displacement variation | |
|---|---|---|
| Temperature range | Horizontal displacement variation | Vertical displacement variation |
| T1-T2 | 100 | 200 |
| T2-T3 | 500 | 300 |
| T3-T4 | 800 | 300 |
| ... | ... | ... |

When the projector 1 is operating, the processing unit 20 receives a current image and the temperature sensing unit 16 senses a current temperature (step S11). It should be noted that the current image is projected by the projector 1 to form the projected image PI shown in FIG. 3. Then, the processing unit 20 compares the current temperature with the temperature ranges (as shown in table 1) to determine a current displacement variation corresponding to the current temperature from the displacement variations (step S12). In this embodiment, the current displacement variation may comprise a horizontal displacement variation and a vertical displacement variation. For example, when the current temperature is between T2 and T3, the horizontal displacement variation of the projected image PI is 500 units and the vertical displacement variation of the projected image PI is 200 units. Then, the processing unit 20 performs at least one of following steps according to the current displacement variation: controlling the displacement adjusting unit 12 to adjust a displacement of the lens 10; adjusting a displacement of the current image on the imaging unit 14; and performing an image adjusting process for the current image. In other words, the processing unit 20 may selectively control the displacement adjusting unit 12 to adjust the displacement of the lens 10, adjust the displacement of the current image on the imaging unit 14 and/or perform the image adjusting process for the current image according to the current temperature (step S13), so as to prevent the projected image PI from shifting with respect to the projection plane PP due to thermal drift.

In this embodiment, the invention may establish a look-up table shown in table 2 below for the displacement adjusting unit 12 and the imaging unit 14 first. As shown in table 2 below, 1 unit of the horizontal displacement variation may be compensated when the horizontal displacement adjusting motor 120 rotates 3 steps, 1 unit of the vertical displacement variation may be compensated when the vertical displacement adjusting motor 122 rotates 3 steps, 1 unit of the horizontal displacement variation may be compensated when a horizontal displacement of the current image on the imaging unit 14 is 10 pixels, and 1 unit of the vertical displacement variation may be compensated when a vertical displacement of the current image on the imaging unit 14 is 10 pixels. It should be noted that the values shown in table 2 are only used for illustration purpose and the invention is not so limited.

TABLE 2

| | | 1 unit of horizontal displacement variation | 1 unit of vertical displacement variation |
|---|---|---|---|
| Displacement adjusting unit | Steps of horizontal displacement adjusting motor | 3 steps | N/A |
| | Steps of vertical displacement adjusting motor | N/A | 3 steps |
| Imaging unit | Horizontal displacement | 10 pixels | N/A |
| | Vertical displacement | N/A | 10 pixels |

How to control the displacement adjusting unit 12 to adjust the displacement of the lens 10 is depicted in the following, so as to compensate the current displacement variation of the projected image PI. As shown in table 1, when the current temperature is between T2 and T3, the horizontal displacement variation of the projected image PI is 500 units and the vertical displacement variation of the projected image PI is 200 units. In other words, as shown in FIG. 3, the projected image PI will exceed the projection plane PP rightwards by 500 units and exceed the projection plane PP upwards by 200 units. At this time, the processing unit 20 may control the horizontal displacement adjusting motor 120 to adjust the horizontal displacement of the lens 10 leftwards and control the vertical displacement adjusting motor 122 to adjust the vertical displacement of the lens 10 downwards according to the current displacement variation. As shown in table 2, when the horizontal displacement variation of the projected image PI is 500 units rightwards, the processing unit 20 may control the horizontal displacement adjusting motor 120 to rotate 1500 steps to adjust the horizontal displacement of the lens 10 leftwards, so as to move the projected image PI leftwards by 500 units. Similarly, when the vertical displacement variation of the projected image PI is 200 units upwards, the processing unit 20 may control the vertical displacement adjusting motor 122 to rotate 600 steps to adjust the vertical displacement of the lens 10 downwards, so as to move the projected image PI downwards by 200 units. Accordingly, the invention may prevent the projected image PI from shifting with respect to the projection plane PP due to thermal drift.

It should be noted that when the displacement adjusting unit 12 cannot completely compensate the current displacement variation of the projected image PI due to mechanical limitation (e.g. the horizontal displacement adjusting motor 120 may only rotate 500 steps), the invention may further adjust the displacement of the current image on the imaging unit 14 and/or perform the image adjusting process for the current image.

Figure 4:
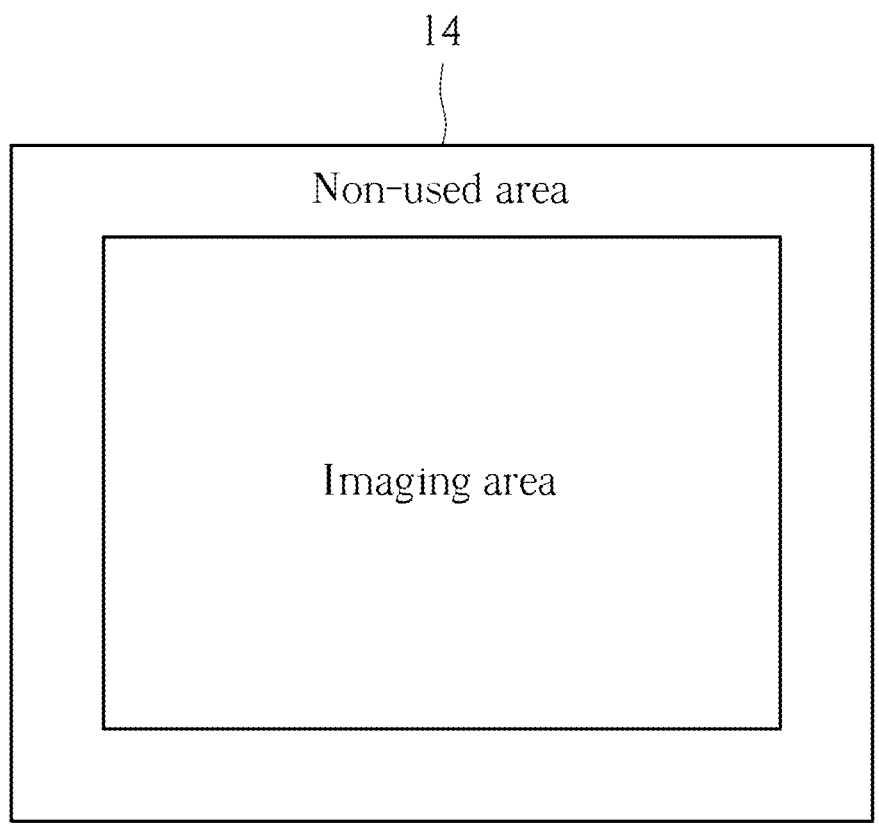
FIG. 4 is a schematic diagram illustrating the imaging unit.

How to adjust the displacement of the current image on the imaging unit 14 is depicted in the following, so as to compensate the current displacement variation of the projected image PI. Referring to FIG. 4, FIG. 4 is a schematic diagram illustrating the imaging unit 14. When the imaging unit 14 is being used, not all areas of the imaging unit 14 are used to form an image. As shown in FIG. 4, an area outside an imaging area of the imaging unit 14 may be defined as a non-used area. The non-used area may be used to compensate the current displacement variation of the projected image PI. As shown in table 1, when the current temperature is between T2 and T3, the horizontal displacement variation of the projected image PI is 500 units and the vertical displacement variation of the projected image PI is 200 units. At this time, the processing unit 20 may adjust the displacement of the current image on the imaging unit 14 according to the current displacement variation. As shown in table 2, when the horizontal displacement variation of the projected image PI is 500 units rightwards, the processing unit 20 may move the current image leftwards by 5000 pixels on the imaging unit 14, so as to move the projected image PI leftwards by 500 units. Similarly, when the vertical displacement variation of the projected image PI is 200 units upwards, the processing unit 20 may move the current image downwards by 2000 pixels on the imaging unit 14, so as to move the projected image PI downwards by 200 units. Accordingly, the invention may prevent the projected image PI from shifting with respect to the projection plane PP due to thermal drift.

It should be noted that when the non-used area of the imaging unit 14 cannot completely compensate the current displacement variation of the projected image PI due to mechanical limitation (e.g. the current image may only moves leftwards by 3000 pixels on the imaging unit 14), the invention may further control the displacement adjusting unit 12 to adjust the displacement of the lens 10 and/or perform the image adjusting process for the current image.

How to perform the image adjusting process for the current image is depicted in the following, so as to compensate the current displacement variation of the projected image PI. In this embodiment, the image adjusting process may comprise at least one of following steps: reducing the current image; enlarging the current image; and trimming the current image.

Figure 5:
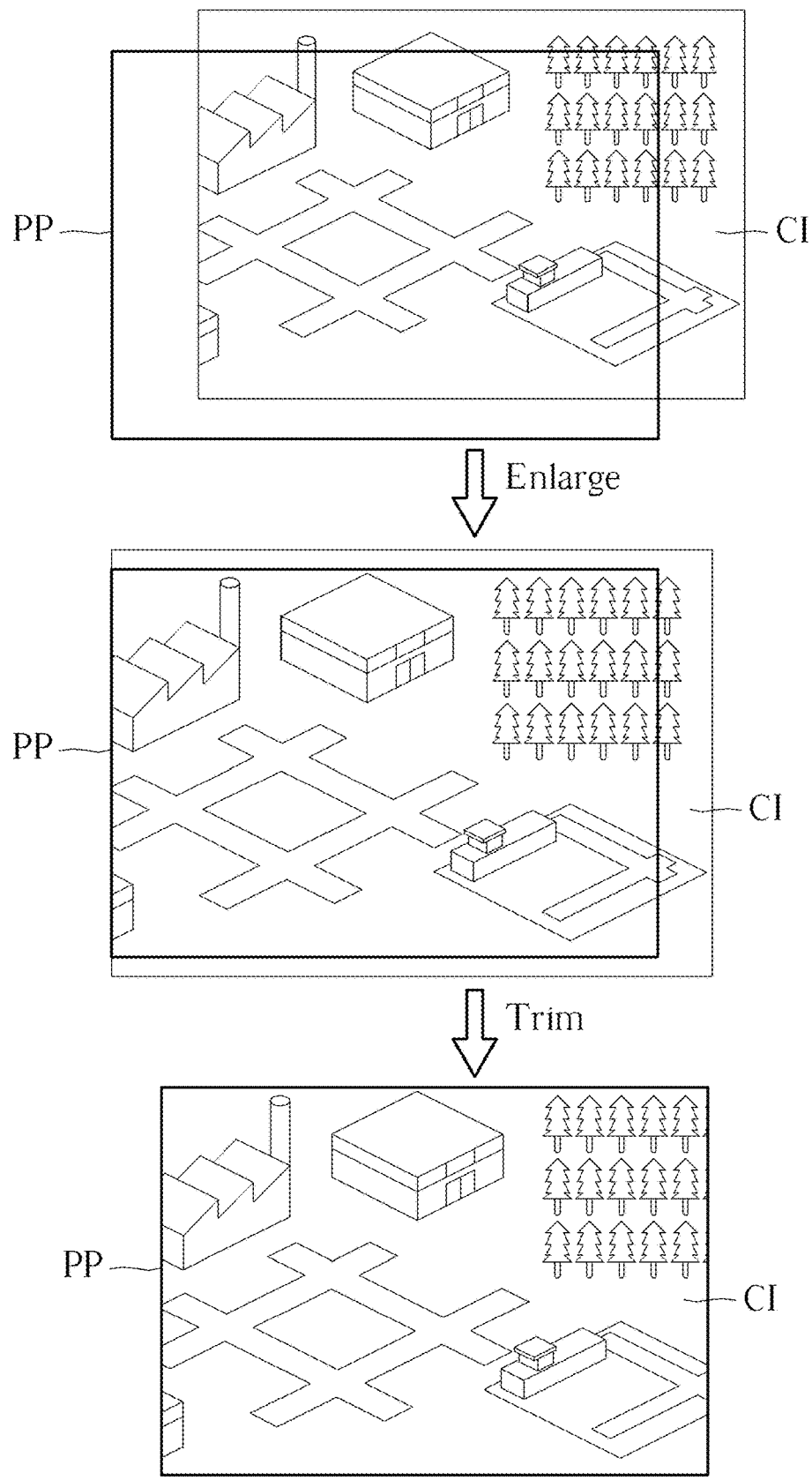
FIG. 5 is a schematic diagram illustrating that the current image is enlarged first and then trimmed.
Figure 6:
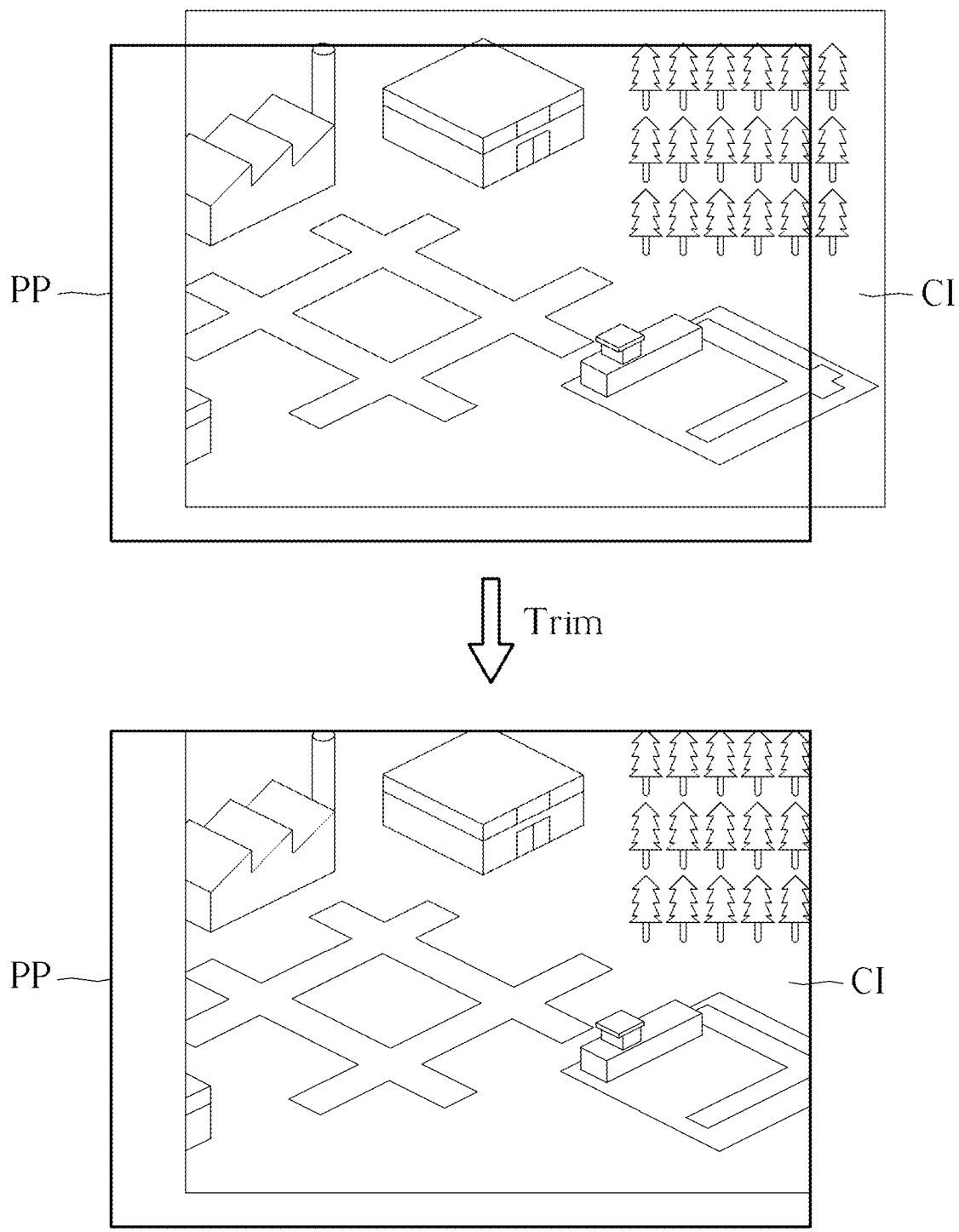
FIG. 6 is a schematic diagram illustrating that the current image is trimmed directly according to a size of the projection plane.
Figure 7:
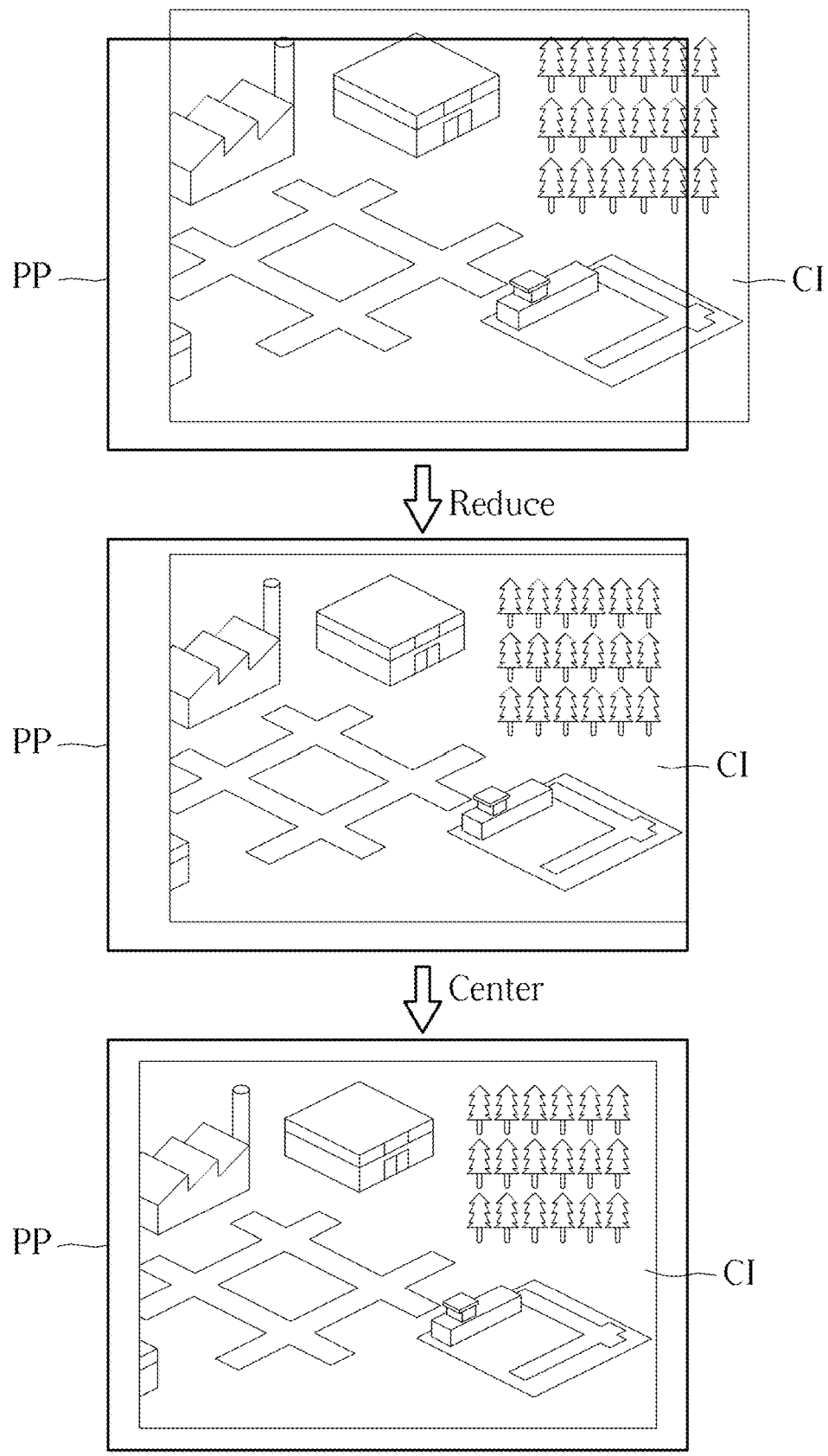
FIG. 7 is a schematic diagram illustrating that the current image is reduced first and then centered on the projection plane.

Referring to FIGS. 5 to 7, FIG. 5 is a schematic diagram illustrating that the current image CI is enlarged first and then trimmed, FIG. 6 is a schematic diagram illustrating that the current image CI is trimmed directly according to a size of the projection plane PP, and FIG. 7 is a schematic diagram illustrating that the current image CI is reduced first and then centered on the projection plane PP. It should be noted that the current image CI shown in FIGS. 5 to 7 is projected by the projector 1 to form the projected image PI shown in FIG. 3. Accordingly, when the current image CI is adjusted, the projected image PI is adjusted. Before performing the image adjusting process for the current image CI, the processing unit 20 may determine whether the current image CI is allowed to be trimmed. When the processing unit 20 determines that the current image CI is allowed to be trimmed, the processing unit 20 may enlarge the current image CI according to a size of the projection plane PP first and then trim the current image CI according to the size of the projection plane PP, as shown in FIG. 5. Needless to say, the processing unit 20 may also directly trim the current image CI according to the size of the projection plane PP, as shown in FIG. 6. When the processing unit 20 determines that the current image CI is not allowed to be trimmed, the processing unit 20 may reduce the current image according to the size of the projection plane PP first and then center the current image CI on the projection plane PP, as shown in FIG. 7. It should be noted that the current image CI may be enlarged or reduced proportionally, but is not so limited.

Accordingly, the invention may prevent the projected image PI from shifting with respect to the projection plane PP due to thermal drift. It should be noted that the size of the projection plane PP may be set by a user or detected by a system automatically. Furthermore, whether the current image CI is allowed to be trimmed may be set by the user or system default.

Figure 8:
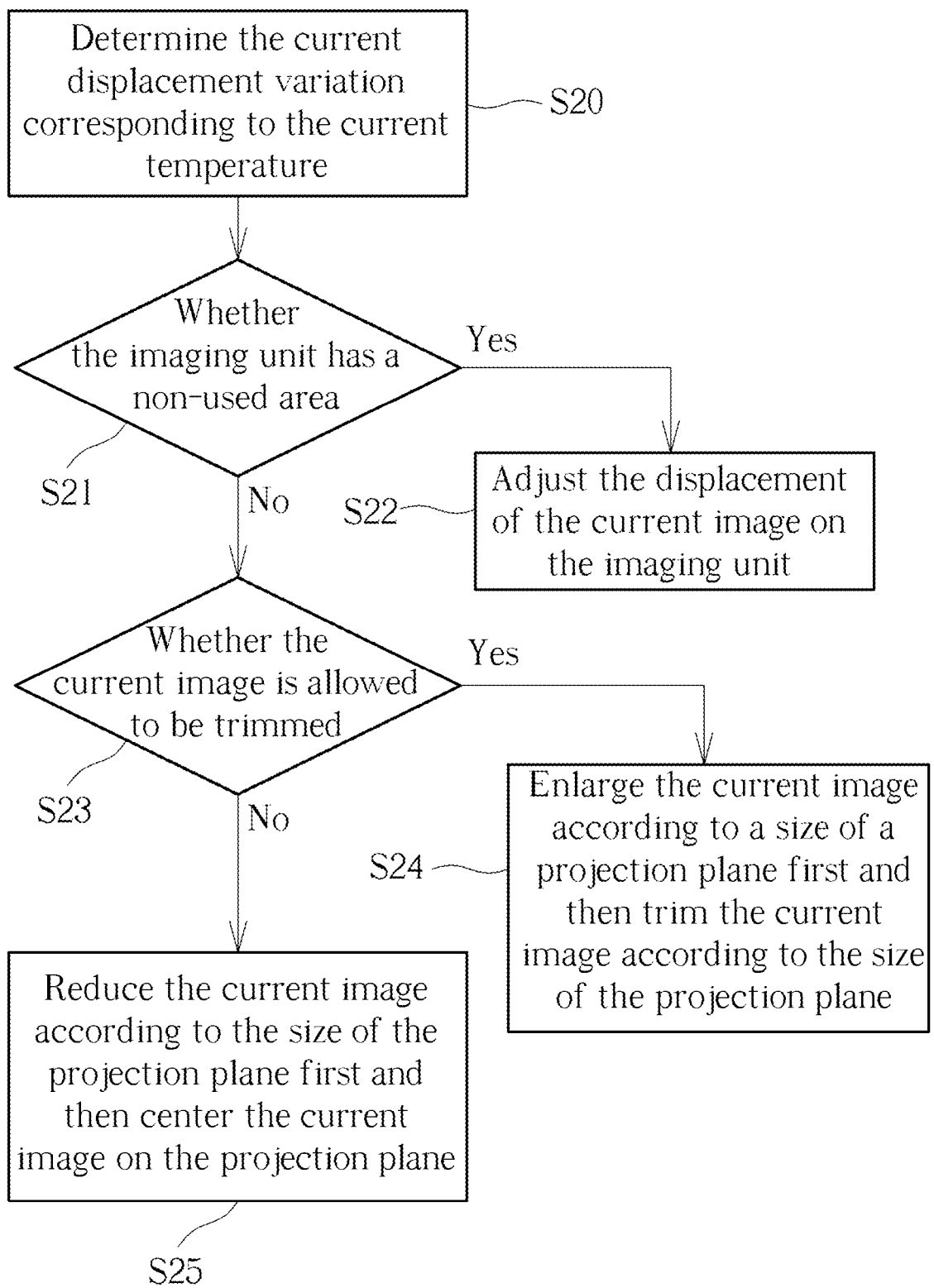
FIG. 8 is a flowchart illustrating a projection method according to another embodiment of the invention.

Referring to FIG. 8, FIG. 8 is a flowchart illustrating a projection method according to another embodiment of the invention. In another embodiment, the invention may determine how to adjust the projected image PI by the projection method shown in FIG. 8. As shown in FIG. 8, after determining the current displacement variation corresponding to the current temperature (step S20), the processing unit 20 may determine whether the imaging unit 14 has a non-used area (step S21). When the processing unit 20 determines that the imaging unit 14 has a non-used area, the processing unit 20 may adjusts the displacement of the current image on the imaging unit 14 according to the aforesaid manner (step S22). When the processing unit 20 determines that the imaging unit 14 has no non-used area, the processing unit 20 may further determine whether the current image is allowed to be trimmed (step S23). When the processing unit 20 determines that the current image CI is allowed to be trimmed, the processing unit 20 may enlarge the current image CI according to a size of a projection plane PP first and then trim the current image CI according to the size of the projection plane (step S24). When the processing unit 20 determines that the current image CI is not allowed to be trimmed, the processing unit 20 may reduce the current image CI according to the size of the projection plane PP first and then center the current image CI on the projection plane PP (step S25).

Figure 9:
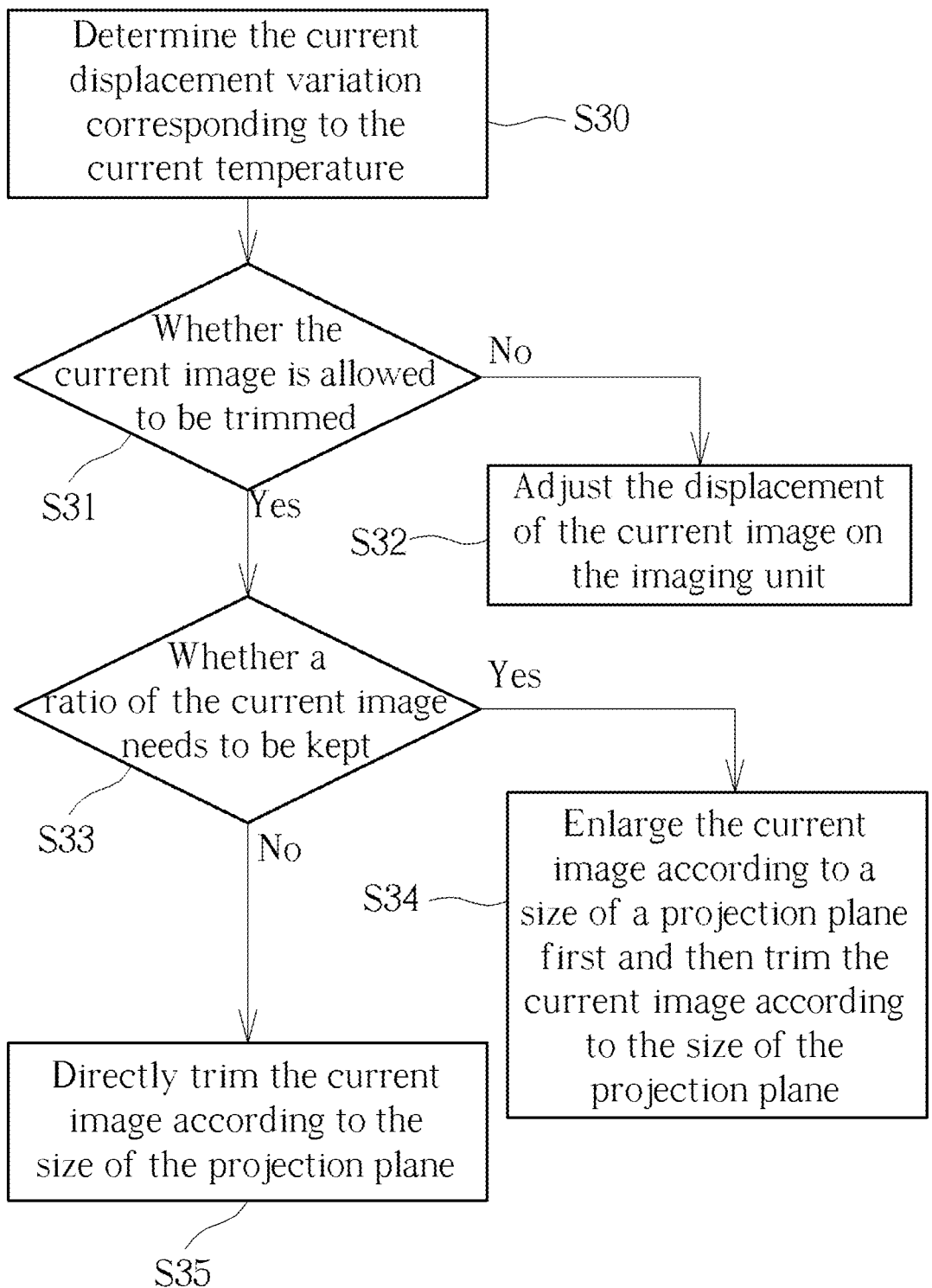
FIG. 9 is a flowchart illustrating a projection method according to another embodiment of the invention.

Referring to FIG. 9, FIG. 9 is a flowchart illustrating a projection method according to another embodiment of the invention. In another embodiment, the invention may determine how to adjust the projected image PI by the projection method shown in FIG. 9. As shown in FIG. 9, after determining the current displacement variation corresponding to the current temperature (step S30), the processing unit 20 may determine whether the current image CI is allowed to be trimmed (step S31). When the processing unit 20 determines that the current image CI is not allowed to be trimmed, the processing unit 20 may adjust the displacement of the current image CI on the imaging unit 14 (step S32). When the processing unit 20 determines that the current image CI is allowed to be trimmed, the processing unit 20 may further determine whether a ratio of the current image CI needs to be kept (step S33). When the processing unit 20 determines that the ratio of the current image CI needs to be kept, the processing unit 20 may enlarge the current image CI according to a size of a projection plane PP first and then trim the current image CI according to the size of the projection plane PP (step S34). When the processing unit 20 determines that the ratio of the current image needs not to be kept, the processing unit 20 may directly trim the current image CI according to the size of the projection plane PP (step S35). It should be noted that whether the ratio of the current image needs not to be kept may be set by the user or system default.

When the projector 1 does not comprise the displacement adjusting unit 12, the projector 1 may adjust the projected image PI by the projection method shown in FIG. 8 or 9. Needless to say, the projector 1 comprising the displacement adjusting unit 12 may also adjust the projected image PI by the projection method shown in FIG. 8 or 9.

Figure 10:
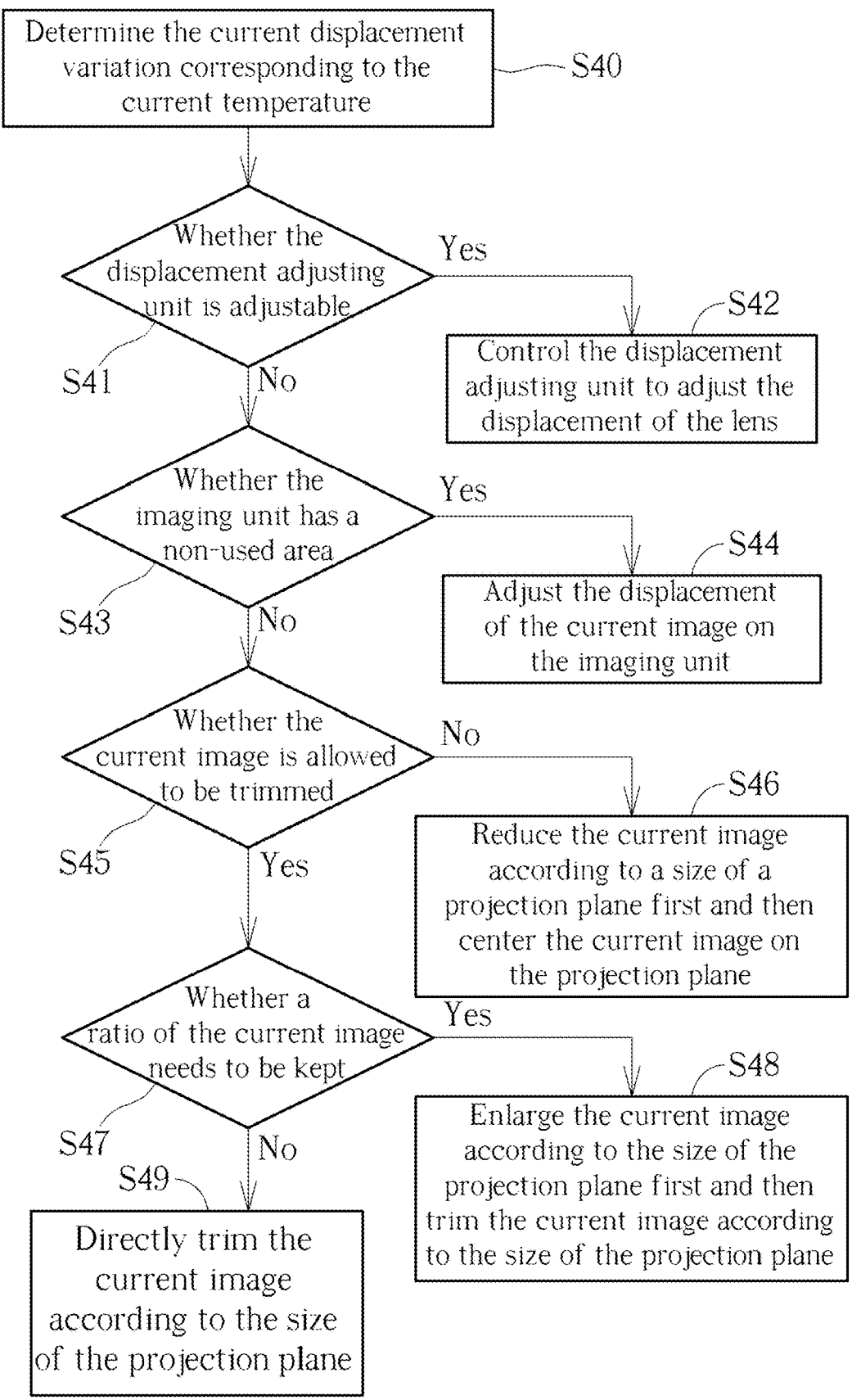
FIG. 10 is a flowchart illustrating a projection method according to another embodiment of the invention.

Referring to FIG. 10, FIG. 10 is a flowchart illustrating a projection method according to another embodiment of the invention. In another embodiment, the invention may determine how to adjust the projected image PI by the projection method shown in FIG. 10. As shown in FIG. 10, after determining the current displacement variation corresponding to the current temperature (step S40), the processing unit 20 may determine whether the displacement adjusting unit 12 is adjustable (step S41). When the processing unit 20 determines that the displacement adjusting unit 12 is adjustable, the processing unit 20 may control the displacement adjusting unit 12 to adjust the displacement of the lens 10 according to the aforesaid manner (step S42). When the processing unit 20 determines that the displacement adjusting unit 12 is not adjustable, the processing unit 20 may further determine whether the imaging unit 14 has a non-used area (step S43). When the processing unit 20 determines that the imaging unit 14 has a non-used area, the processing unit 20 may adjust the displacement of the current image CI on the imaging unit 14 (step S44). When the processing unit 20 determines that the imaging unit 14 has no non-used area, the processing unit 20 may further determine whether the current image CI is allowed to be trimmed (step S45). When the processing unit 20 determines that the current image CI is not allowed to be trimmed, the processing unit 20 may reduce the current image CI according to a size of a projection plane PP first and then center the current image CI on the projection plane PP (step S46). When the processing unit 20 determines that the current image CI is allowed to be trimmed, the processing unit 20 may further determine whether a ratio of the current image CI needs to be kept (step S47). When the processing unit 20 determines that the ratio of the current image CI needs to be kept, the processing unit 20 may enlarge the current image CI according to the size of the projection plane PP first and then trim the current image CI according to the size of the projection plane PP (step S48). When the processing unit 20 determines that the ratio of the current image CI needs not to be kept, the processing unit 20 may directly trim the current image CI according to the size of the projection plane PP (step S49).

Figure 11:
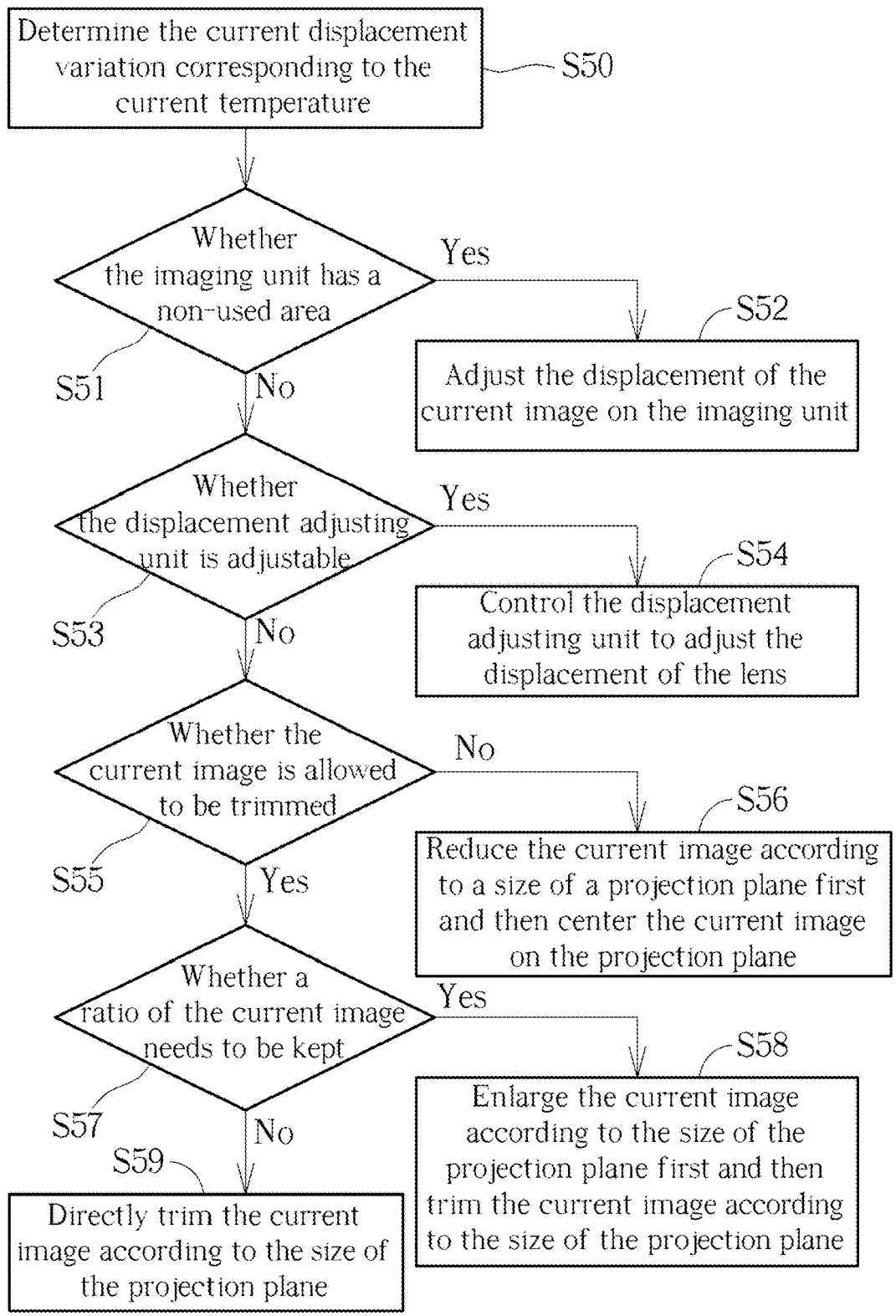
FIG. 11 is a flowchart illustrating a projection method according to another embodiment of the invention.

Referring to FIG. 11, FIG. 11 is a flowchart illustrating a projection method according to another embodiment of the invention. In another embodiment, the invention may determine how to adjust the projected image PI by the projection method shown in FIG. 11. As shown in FIG. 11, after determining the current displacement variation corresponding to the current temperature (step S50), the processing unit 20 may determine whether the imaging unit 14 has a non-used area (step S51). When the processing unit 20 determines that the imaging unit 14 has a non-used area, the processing unit 20 may adjust the displacement of the current image CI on the imaging unit 14 (step S52). When the processing unit 20 determines that the imaging unit 14 has no non-used area, the processing unit 20 may further determine whether the displacement adjusting unit 12 is adjustable (step S53). When the processing unit 20 determines that the displacement adjusting unit 12 is adjustable, the processing unit 20 may control the displacement adjusting unit 12 to adjust the displacement of the lens 10 according to the aforesaid manner (step S54). When the processing unit 20 determines that the displacement adjusting unit 12 is not adjustable, the processing unit 20 may further determine whether the current image CI is allowed to be trimmed (step S55). When the processing unit 20 determines that the current image CI is not allowed to be trimmed, the processing unit 20 may reduce the current image CI according to a size of a projection plane PP first and then center the current image CI on the projection plane PP (step S56). When the processing unit 20 determines that the current image CI is allowed to be trimmed, the processing unit 20 may further determine whether a ratio of the current image CI needs to be kept (step S57). When the processing unit 20 determines that the ratio of the current image CI needs to be kept, the processing unit 20 may enlarge the current image CI according to the size of the projection plane PP first and then trim the current image CI according to the size of the projection plane PP (step S58). When the processing unit 20 determines that the ratio of the current image CI needs not to be kept, the processing unit 20 may directly trim the current image CI according to the size of the projection plane PP (step S59).

Figure 12:
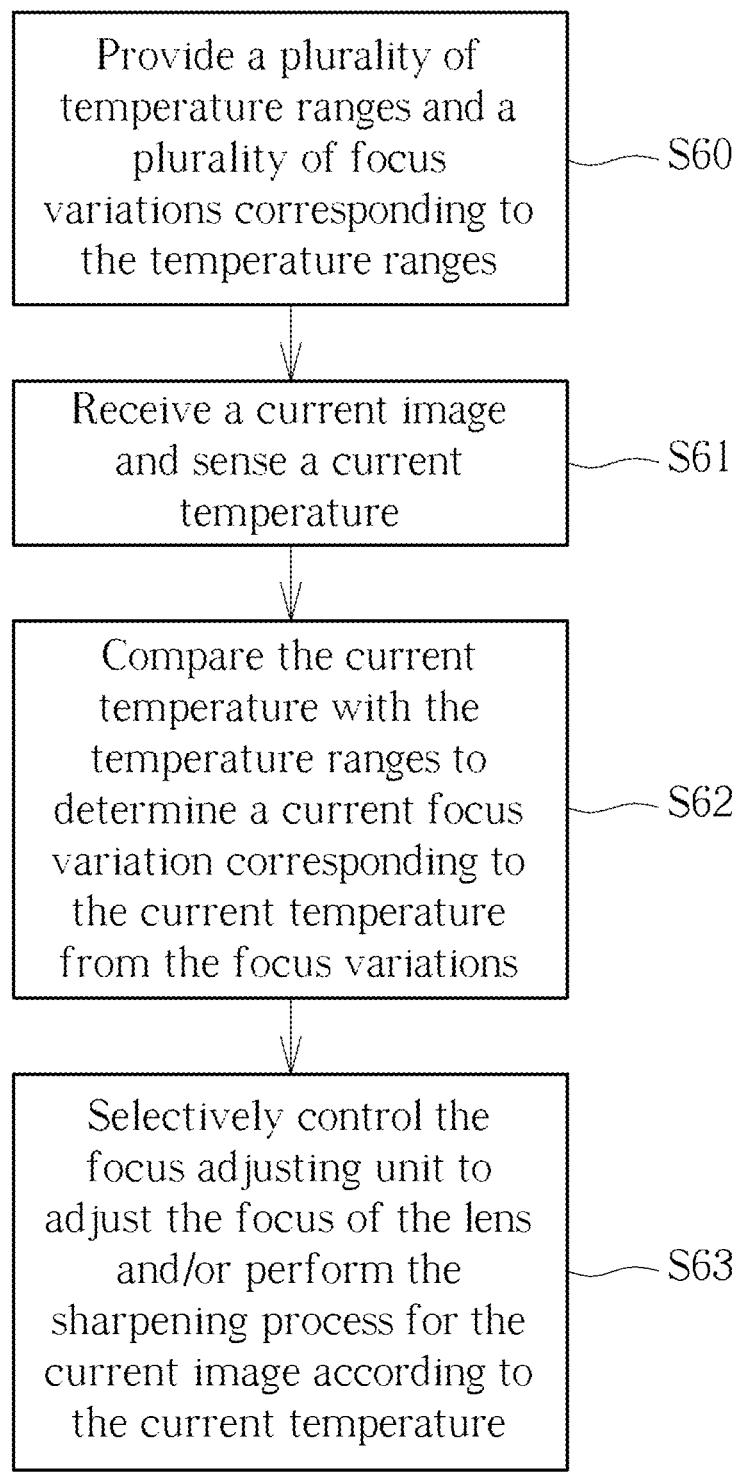
FIG. 12 is a flowchart illustrating a projection method according to another embodiment of the invention.
Figure 13:
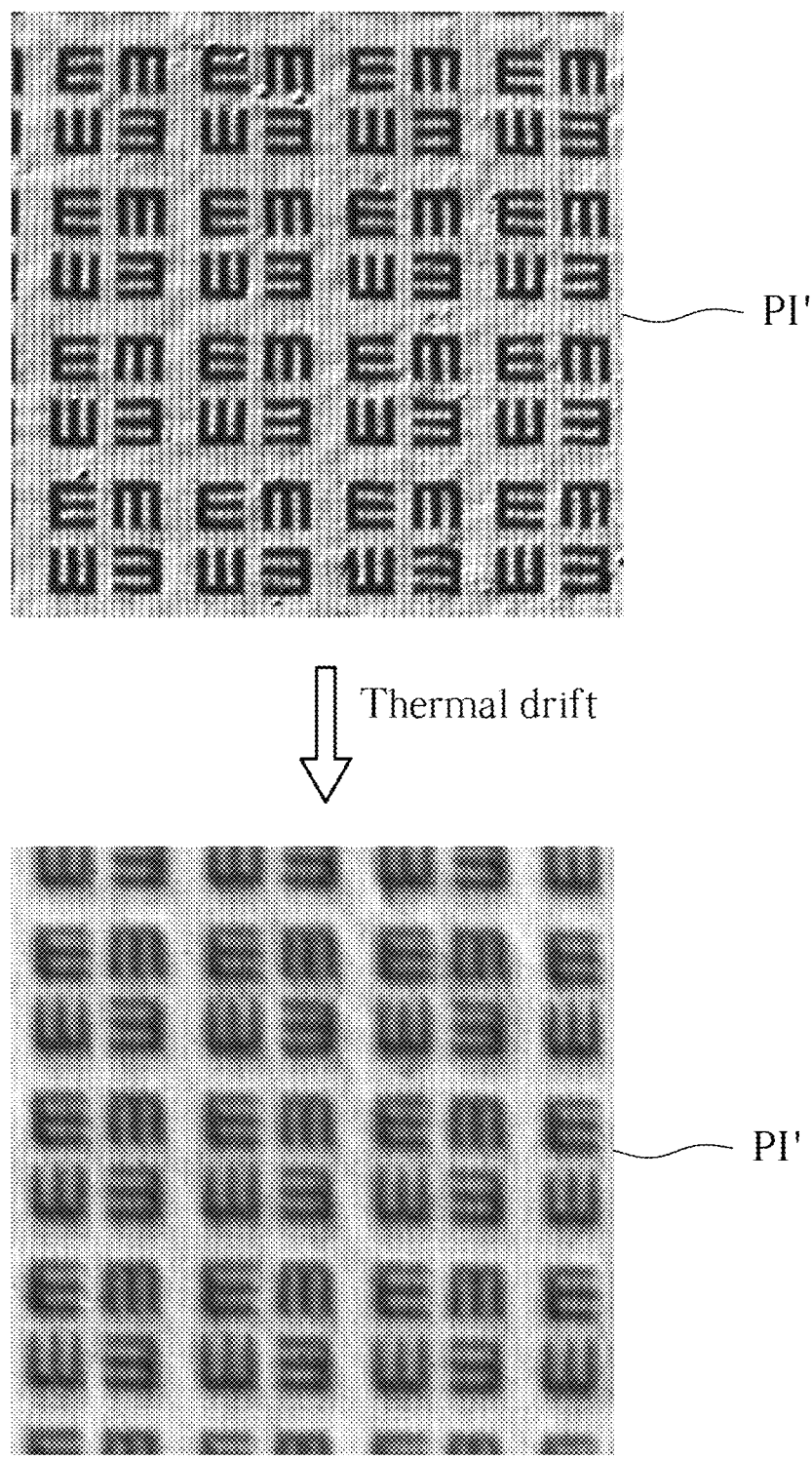
FIG. 13 is a schematic diagram illustrating that a projected image blurs due to thermal drift.

Referring to FIGS. 12 and 13, FIG. 12 is a flowchart illustrating a projection method according to another embodiment of the invention and FIG. 13 is a schematic diagram illustrating that a projected image PI' blurs due to thermal drift. The projection method shown in FIG. 12 is also adapted to the aforesaid projector 1. When the projected image PI' of the projector 1 blurs (i.e. out of focus) due to thermal drift (as shown in FIG. 13), the projection method shown in FIG. 12 may be used to adjust the projected image PI'. First, the invention may provide a plurality of temperature ranges and a plurality of focus variations corresponding to the temperature ranges for the projector 1 (step S60), as shown in table 3 below. The storage unit 18 is configured to store the temperature ranges and the focus variations corresponding to the temperature ranges shown in table 3. In this embodiment, the focus variation may be represented by a width variation of a straight line of 1 pixel in the image. The invention may measure the width variation of the straight line of 1 pixel in the projected image PI' of the projector 1 under different temperature ranges, so as to obtain the look-up table shown in table 3. Then, the invention stores the look-up table in the storage unit 18. It should be noted that the values shown in table 3 are only used for illustration purpose and the invention is not so limited.

TABLE 3

| Temperature range | Focus variation (width variation of straight line of 1 pixel in image) |
|---|---|
| T1-T2 | +1 |
| T2-T3 | +5 |
| T3-T4 | +8 |
| . . . | . . . |

When the projector 1 is operating, the processing unit 20 receives a current image and the temperature sensing unit 16 senses a current temperature (step S61). It should be noted that the current image is projected by the projector 1 to form the projected image PI' shown in FIG. 13. Then, the processing unit 20 compares the current temperature with the temperature ranges (as shown in table 3) to determine a current focus variation corresponding to the current temperature from the focus variations (step S62). For example, when the current temperature is between T2 and T3, the current focus variation of the projected image PI' is 5. Then, the processing unit 20 performs at least one of following steps according to the current focus variation: controlling the focus adjusting unit 22 to adjust a focus of the lens 10; and performing a sharpening process for the current image. In other words, the processing unit 20 may selectively control the focus adjusting unit 22 to adjust the focus of the lens 10 and/or perform the sharpening process for the current image according to the current temperature (step S63), so as to prevent the projected image PI' from blurring (i.e. out of focus) due to thermal drift.

In this embodiment, the invention may establish a look-up table shown in table 4 below for the focus adjusting unit 22 and the sharpening level first. As shown in table 4 below, 1 unit of the focus variation may be compensated when the focus adjusting unit 22 rotates 5 steps and 1 unit of the focus variation may be compensated when the sharpening level is 6. It should be noted that the values shown in table 4 are only used for illustration purpose and the invention is not so limited. Furthermore, the sharpening process of the invention may be implemented by unsharpen mask or other sharpening methods. Moreover, the principle and setting of the sharpening level in the sharpening process are well known by one skilled in the art, so the related explanation will not be depicted herein.

TABLE 4

| | 1 unit of focus variation |
|---|---|
| Steps of focus adjusting unit 22 | 5 |
| Sharpening level | 6 |

As shown in table 3, when the current temperature is between T2 and T3, the current focus variation of the projected image PI' is 5. At this time, as shown in table 4, the processing unit 20 may control the focus adjusting unit 22 to rotate 25 steps to adjust the focus of the lens 10. Furthermore, the processing unit 20 may also perform the sharpening process for the current image according to the sharpening level shown in table 4. Accordingly, the invention may prevent the projected image PI' from blurring (i.e. out of focus) due to thermal drift.

Figure 14:
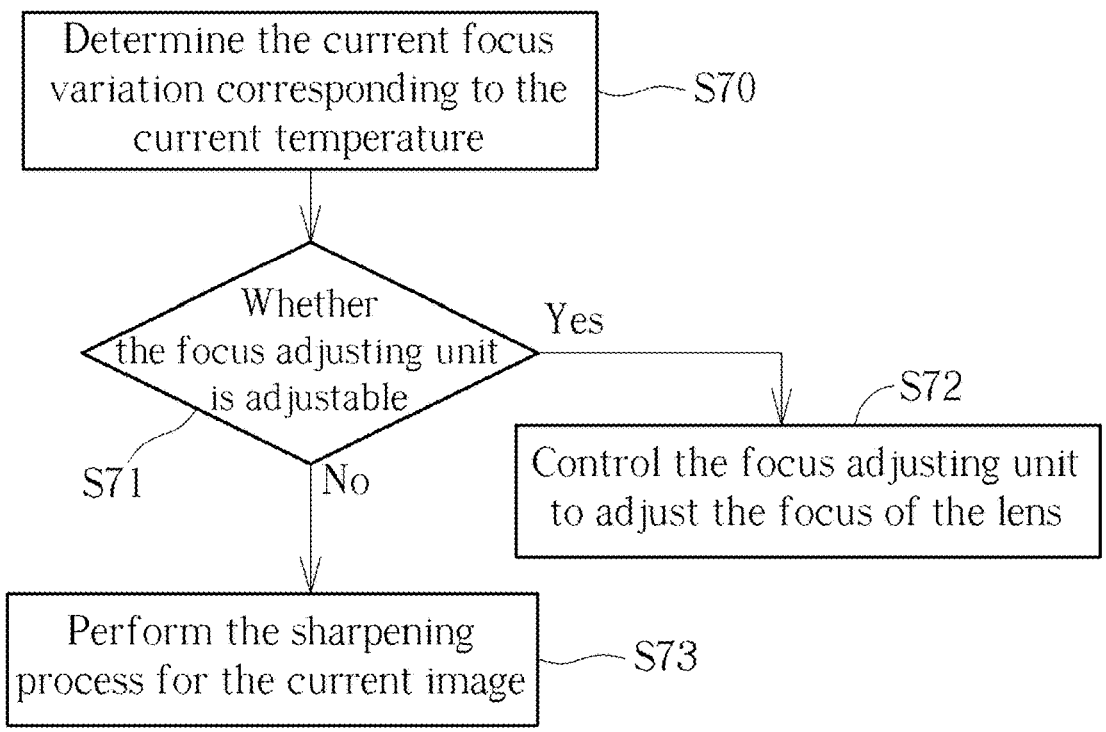
FIG. 14 is a flowchart illustrating a projection method according to another embodiment of the invention.

Referring to FIG. 14, FIG. 14 is a flowchart illustrating a projection method according to another embodiment of the invention. In another embodiment, the invention may determine how to adjust the projected image PI' by the projection method shown in FIG. 14. As shown in FIG. 14, after determining the current focus variation corresponding to the current temperature (step S70), the processing unit 20 may determine whether the focus adjusting unit 22 is adjustable (step S71). When the processing unit 20 determines that the focus adjusting unit 22 is adjustable, the processing unit 20 may control the focus adjusting unit 22 to adjust the focus of the lens 10 (step S72). When the processing unit 20 determines that the focus adjusting unit 22 is not adjustable, the processing unit 20 may perform the sharpening process for the current image (step S73).

Figure 15:
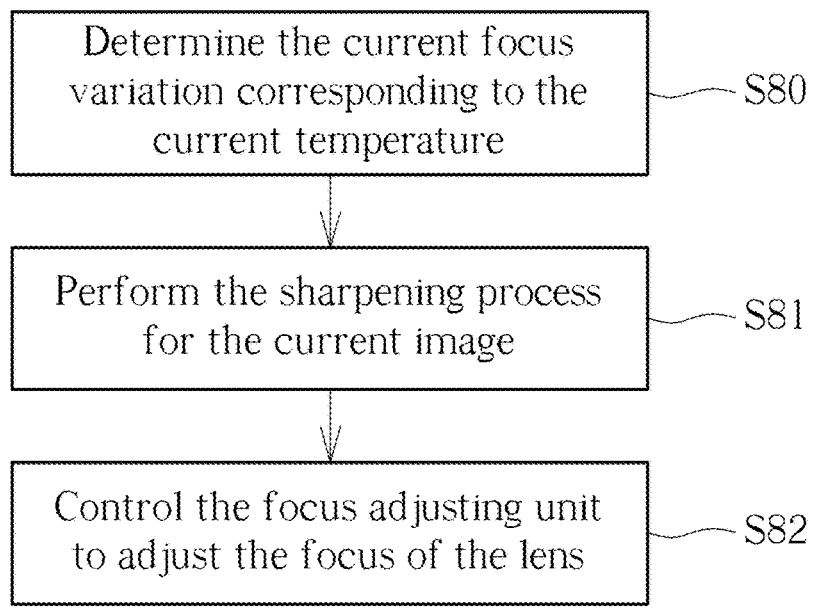
FIG. 15 is a flowchart illustrating a projection method according to another embodiment of the invention.

Referring to FIG. 15, FIG. 15 is a flowchart illustrating a projection method according to another embodiment of the invention. As shown in FIG. 15, in another embodiment, after determining the current focus variation corresponding to the current temperature (step S80), the processing unit 20 may perform the sharpening process for the current image (step S81) first and then control the focus adjusting unit 22 to adjust the focus of the lens 10 (step S82).

It should be noted that when the projector 1 does not comprise the focus adjusting unit 22, the projector 1 may directly perform the sharpening process for the current image.

Furthermore, each part or function of the control logic of the projection method of the invention may be implemented by a combination of software and hardware.

As mentioned in the above, the invention may selectively control the displacement adjusting unit (if any) to adjust the displacement of the lens, adjust the displacement of the current image on the imaging unit and/or perform the image adjusting process for the current image according to the current temperature, so as to prevent the projected image from shifting with respect to the projection plane due to thermal drift. Furthermore, the invention may selectively control the focus adjusting unit (if any) to adjust the focus of the lens and/or perform the sharpening process for the current image according to the current temperature, so as to prevent the projected image from blurring (i.e. out of focus) due to thermal drift.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector comprising:
    a lens;
    a displacement adjusting unit connected to the lens;
    an imaging unit disposed with respect to the lens;
    a temperature sensing unit sensing a current temperature;
    a storage unit storing a plurality of temperature ranges and a plurality of displacement variations corresponding to the temperature ranges; and
    a processing unit electrically connected to the displacement adjusting unit, the imaging unit, the temperature sensing unit and the storage unit;
    wherein the processing unit receives a current image, the processing unit compares the current temperature with the temperature ranges to determine a current displacement variation corresponding to the current temperature from the displacement variations, the processing unit performs at least one of following steps according to the current displacement variation:
        controlling the displacement adjusting unit to adjust a horizontal displacement and a vertical displacement of the lens;
        adjusting a displacement of the current image on the imaging unit; and
        performing an image adjusting process for the current image.

2. The projector of claim 1, wherein the displacement adjusting unit comprises a horizontal displacement adjusting motor and/or a vertical displacement adjusting motor, the processing unit controls the horizontal displacement adjusting motor to adjust the horizontal displacement of the lens and/or controls the vertical displacement adjusting motor to adjust the vertical displacement of the lens according to the current displacement variation.

3. The projector of claim 1, wherein the image adjusting process comprises at least one of following steps:
    reducing the current image;
    enlarging the current image; and
    trimming the current image.

4. The projector of claim 3, wherein before performing the image adjusting process for the current image, the processing unit determines whether the current image is allowed to be trimmed; when the processing unit determines that the current image is allowed to be trimmed, the processing unit enlarges the current image according to a size of a projection plane first and then trims the current image according to the size of the projection plane; when the processing unit determines that the current image is not allowed to be trimmed, the processing unit reduces the current image according to the size of the projection plane first and then centers the current image on the projection plane.

5. The projector of claim 1, wherein after determining the current displacement variation corresponding to the current temperature, the processing unit determines whether the imaging unit has a non-used area; when the processing unit determines that the imaging unit has a non-used area, the processing unit adjusts the displacement of the current image on the imaging unit; when the processing unit determines that the imaging unit has no non-used area, the processing unit determines whether the current image is allowed to be trimmed; when the processing unit determines that the current image is allowed to be trimmed, the processing unit enlarges the current image according to a size of a projection plane first and then trims the current image according to the size of the projection plane; when the processing unit determines that the current image is not allowed to be trimmed, the processing unit reduces the current image according to the size of the projection plane first and then centers the current image on the projection plane.

6. The projector of claim 1, wherein after determining the current displacement variation corresponding to the current temperature, the processing unit determines whether the current image is allowed to be trimmed; when the processing unit determines that the current image is not allowed to be trimmed, the processing unit adjusts the displacement of the current image on the imaging unit; when the processing unit determines that the current image is allowed to be trimmed, the processing unit determines whether a ratio of the current image needs to be kept; when the processing unit determines that the ratio of the current image needs to be kept, the processing unit enlarges the current image according to a size of a projection plane first and then trims the current image according to the size of the projection plane; when the processing unit determines that the ratio of the current image needs not to be kept, the processing unit directly trims the current image according to the size of the projection plane.

7. The projector of claim 1, wherein after determining the current displacement variation corresponding to the current temperature, the processing unit determines whether the displacement adjusting unit is adjustable; when the processing unit determines that the displacement adjusting unit is adjustable, the processing unit controls the displacement adjusting unit to adjust the displacement of the lens; when the processing unit determines that the displacement adjusting unit is not adjustable, the processing unit determines whether the imaging unit has a non-used area; when the processing unit determines that the imaging unit has a non-used area, the processing unit adjusts the displacement of the current image on the imaging unit; when the processing unit determines that the imaging unit has no non-used area, the processing unit determines whether the current image is allowed to be trimmed; when the processing unit determines that the current image is not allowed to be trimmed, the processing unit reduces the current image according to a size of a projection plane first and then centers the current image on the projection plane; when the processing unit determines that the current image is allowed to be trimmed, the processing unit determines whether a ratio of the current image needs to be kept; when the processing unit determines that the ratio of the current image needs to be kept, the processing unit enlarges the current image according to the size of the projection plane first and then trims the current image according to the size of the projection plane; when the processing unit determines that the ratio of the current image needs not to be kept, the processing unit directly trims the current image according to the size of the projection plane.

8. The projector of claim 1, wherein after determining the current displacement variation corresponding to the current temperature, the processing unit determines whether the imaging unit has a non-used area; when the processing unit determines that the imaging unit has a non-used area, the processing unit adjusts the displacement of the current image on the imaging unit; when the processing unit determines that the imaging unit has no non-used area, the processing unit determines whether the displacement adjusting unit is adjustable; when the processing unit determines that the displacement adjusting unit is adjustable, the processing unit controls the displacement adjusting unit to adjust the displacement of the lens; when the processing unit determines that the displacement adjusting unit is not adjustable, the processing unit determines whether the current image is allowed to be trimmed; when the processing unit determines that the current image is not allowed to be trimmed, the processing unit reduces the current image according to a size of a projection plane first and then centers the current image on the projection plane; when the processing unit determines that the current image is allowed to be trimmed, the processing unit determines whether a ratio of the current image needs to be kept; when the processing unit determines that the ratio of the current image needs to be kept, the processing unit enlarges the current image according to the size of the projection plane first and then trims the current image according to the size of the projection plane; when the processing unit determines that the ratio of the current image needs not to be kept, the processing unit directly trims the current image according to the size of the projection plane.

9. The projector of claim 1, further comprising a focus adjusting unit connected to the lens, the processing unit being electrically connected to the focus adjusting unit, the storage unit further storing a plurality of focus variations corresponding to the temperature ranges, the processing unit comparing the current temperature with the temperature ranges to determine a current focus variation corresponding to the current temperature from the focus variations, the processing unit performing at least one of following steps according to the current focus variation:
controlling the focus adjusting unit to adjust a focus of the lens; and
performing a sharpening process for the current image.

10. The projector of claim 9, wherein after determining the current focus variation corresponding to the current temperature, the processing unit determines whether the focus adjusting unit is adjustable; when the processing unit determines that the focus adjusting unit is adjustable, the processing unit controls the focus adjusting unit to adjust the focus of the lens; when the processing unit determines that the focus adjusting unit is not adjustable, the processing unit performs the sharpening process for the current image.

11. The projector of claim 9, wherein after determining the current focus variation corresponding to the current temperature, the processing unit performs the sharpening process for the current image first and then controls the focus adjusting unit to adjust the focus of the lens.

12. A projector comprising:
a lens;
an imaging unit disposed with respect to the lens;
a temperature sensing unit sensing a current temperature;
a storage unit storing a plurality of temperature ranges and a plurality of displacement variations corresponding to the temperature ranges; and
a processing unit electrically connected to the imaging unit, the temperature sensing unit and the storage unit;
wherein the processing unit receives a current image, the processing unit compares the current temperature with the temperature ranges to determine a current displacement variation corresponding to the current temperature from the displacement variations, the processing unit performs at least one of following steps according to the current displacement variation:
adjusting a displacement of the current image on the imaging unit; and
performing an image adjusting process for the current image.

13. The projector of claim 12, wherein before performing the image adjusting process for the current image, the processing unit determines whether the current image is allowed to be trimmed; when the processing unit determines that the current image is allowed to be trimmed, the processing unit enlarges the current image according to a size of a projection plane first and then trims the current image according to the size of the projection plane; when the processing unit determines that the current image is not allowed to be trimmed, the processing unit reduces the current image according to the size of the projection plane first and then centers the current image on the projection plane.

14. The projector of claim 12, wherein after determining the current displacement variation corresponding to the current temperature, the processing unit determines whether the imaging unit has a non-used area; when the processing unit determines that the imaging unit has a non-used area, the processing unit adjusts the displacement of the current image on the imaging unit; when the processing unit determines that the imaging unit has no non-used area, the processing unit determines whether the current image is allowed to be trimmed; when the processing unit determines that the current image is allowed to be trimmed, the processing unit enlarges the current image according to a size of a projection plane first and then trims the current image according to the size of the projection plane; when the processing unit determines that the current image is not allowed to be trimmed, the processing unit reduces the current image according to the size of the projection plane first and then centers the current image on the projection plane.

15. The projector of claim 12, wherein after determining the current displacement variation corresponding to the current temperature, the processing unit determines whether the current image is allowed to be trimmed; when the processing unit determines that the current image is not allowed to be trimmed, the processing unit adjusts the displacement of the current image on the imaging unit; when the processing unit determines that the current image is allowed to be trimmed, the processing unit determines whether a ratio of the current image needs to be kept; when the processing unit determines that the ratio of the current image needs to be kept, the processing unit enlarges the current image according to a size of a projection plane first and then trims the current image according to the size of the projection plane; when the processing unit determines that the ratio of the current image needs not to be kept, the processing unit directly trims the current image according to the size of the projection plane.

16. A projector comprising:
    a lens;
    a focus adjusting unit connected to the lens;
    a temperature sensing unit sensing a current temperature;
    a storage unit storing a plurality of temperature ranges and a plurality of focus variations corresponding to the temperature ranges; and
    a processing unit electrically connected to the focus adjusting unit, the temperature sensing unit and the storage unit;
    wherein the processing unit receives a current image, the processing unit compares the current temperature with the temperature ranges to determine a current focus variation corresponding to the current temperature from the focus variations, the processing unit performs at least one of following steps according to the current focus variation:
        controlling the focus adjusting unit to adjust a focus of the lens; and
        performing a sharpening process for the current image.

17. The projector of claim 16, wherein after determining the current focus variation corresponding to the current temperature, the processing unit determines whether the focus adjusting unit is adjustable; when the processing unit determines that the focus adjusting unit is adjustable, the processing unit controls the focus adjusting unit to adjust the focus of the lens; when the processing unit determines that the focus adjusting unit is not adjustable, the processing unit performs the sharpening process for the current image.

18. The projector of claim 16, wherein after determining the current focus variation corresponding to the current temperature, the processing unit performs the sharpening process for the current image first and then controls the focus adjusting unit to adjust the focus of the lens.

19. A projector comprising:
    a temperature sensing unit sensing a current temperature;
    a storage unit storing a plurality of temperature ranges and a plurality of focus variations corresponding to the temperature ranges; and
    a processing unit electrically connected to the temperature sensing unit and the storage unit;
    wherein the processing unit receives a current image, the processing unit compares the current temperature with the temperature ranges to determine a current focus variation corresponding to the current temperature from the focus variations, the processing unit performs a sharpening process for the current image according to the current focus variation.

20. The projector of claim 19, further comprising a lens, a displacement adjusting unit and an imaging unit, the displacement adjusting unit being connected to the lens, the imaging unit being disposed with respect to the lens, the processing unit being electrically connected to the displacement adjusting unit and the imaging unit, the storage unit further storing a plurality of displacement variations corresponding to the temperature ranges, the processing unit comparing the current temperature with the temperature ranges to determine a current displacement variation corresponding to the current temperature from the displacement variations, the processing unit performing at least one of following steps according to the current displacement variation:
    controlling the displacement adjusting unit to adjust a displacement of the lens;
    adjusting a displacement of the current image on the imaging unit; and
    performing an image adjusting process for the current image.

* * * * *